(12) United States Patent
Nishiwaki

(10) Patent No.: US 9,810,896 B2
(45) Date of Patent: Nov. 7, 2017

(54) MICROSCOPE DEVICE AND MICROSCOPE SYSTEM

(71) Applicant: OLYMPUS CORPORATION, Shibuya-ku, Tokyo (JP)

(72) Inventor: Daisuke Nishiwaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 369 days.

(21) Appl. No.: 14/552,043

(22) Filed: Nov. 24, 2014

(65) Prior Publication Data

US 2015/0177506 A1 Jun. 25, 2015

(30) Foreign Application Priority Data

Dec. 19, 2013 (JP) .................................. 2013-263050
Jun. 2, 2014 (JP) .................................. 2014-114393

(51) Int. Cl.
| | |
|---|---|
| G02B 21/36 | (2006.01) |
| G02B 21/06 | (2006.01) |
| G02B 21/16 | (2006.01) |
| G02B 21/22 | (2006.01) |
| H04N 13/02 | (2006.01) |

(52) U.S. Cl.
CPC ........... *G02B 21/367* (2013.01); *G02B 21/06* (2013.01); *G02B 21/16* (2013.01); *G02B 21/22* (2013.01); *G02B 21/36* (2013.01); *H04N 13/021* (2013.01); *H04N 13/0221* (2013.01); *H04N 13/0228* (2013.01); *H04N 13/0239* (2013.01)

(58) Field of Classification Search
CPC ...... G02B 21/367; G02B 21/06; G02B 21/22; G02B 21/36; H04N 13/021; H04N 13/0221; H04N 13/0228; H04N 13/0239
See application file for complete search history.

(56) References Cited

U.S. PATENT DOCUMENTS

| | | |
|---|---|---|
| 2006/0033987 A1 | 2/2006 | Stelzer et al. |
| 2007/0109633 A1 | 5/2007 | Stelzer |
| 2009/0225413 A1 | 9/2009 | Stelzer et al. |

(Continued)

FOREIGN PATENT DOCUMENTS

| | | |
|---|---|---|
| JP | 2006509246 A | 3/2006 |
| JP | 2012058733 A | 3/2012 |
| WO | 2004053558 A1 | 6/2004 |

OTHER PUBLICATIONS

Keller et al., "Digital Scanned Laser Light Sheet Fluorescence Microscopy," Cold Spring Harb Protoc; May 2010, pp. 1-13.*

(Continued)

*Primary Examiner* — Thai Tran
*Assistant Examiner* — Christopher T Braniff
(74) *Attorney, Agent, or Firm* — Holtz, Holtz & Volek PC

(57) ABSTRACT

A microscope device includes an illumination optical system that illuminates a specimen with a light sheet, and a stereo image capturing device that captures images of the specimen in a plurality of different directions in which a resolution based on a triangulation method in a Z direction orthogonal to a direction of one or a plurality of light sheets formed on the specimen by the illumination optical system is less than a thickness in the Z direction of light sheet illumination that comprises the one or the plurality of light sheets.

15 Claims, 21 Drawing Sheets

(56) References Cited

U.S. PATENT DOCUMENTS

2012/0049087 A1* 3/2012 Choi ................. G01N 21/4795
250/459.1
2012/0056996 A1   3/2012 Sander et al.
2014/0042339 A1   2/2014 Stelzer et al.

OTHER PUBLICATIONS

Verveer et al., "High-Resolution Three-Dimensional Imaging of Large Specimens with Light Sheet-Based Microscopy," Nature Methods, vol. 4, No. 4, Apr. 2007, pp. 311-313.*

* cited by examiner

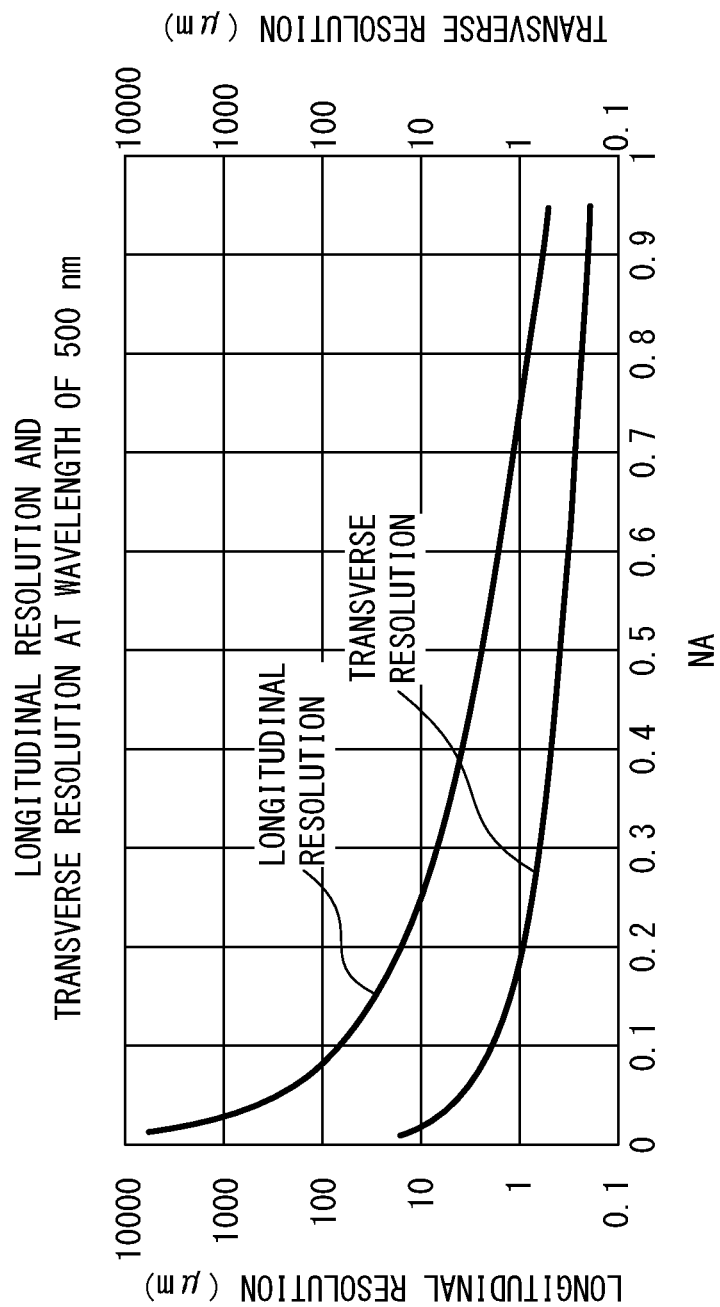
F I G. 1

| △x (μm) | △z (μm) |
|---|---|
| 1 | 4.00016 |
| 2 | 8.00064 |
| 3 | 12.00114 |
| 4 | 16.00256 |
| 5 | 20.004 |
| 6 | 24.00576 |
| 7 | 28.00784 |
| 8 | 32.01024 |
| 9 | 36.01296 |
| 10 | 40.01601 |
| 11 | 44.01937 |
| 12 | 48.02305 |
| 13 | 52.02705 |
| 14 | 56.03138 |
| 15 | 60.03602 |
| 16 | 64.04099 |
| 17 | 68.04627 |

FIG. 6

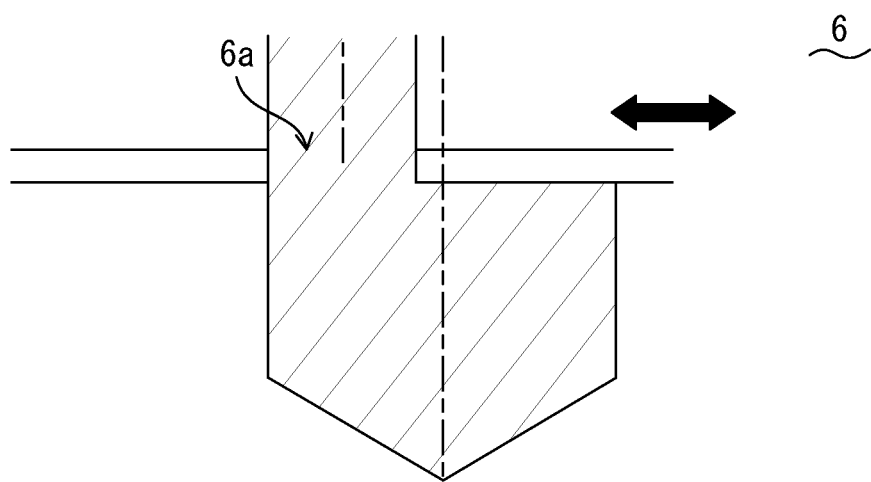
F I G. 10

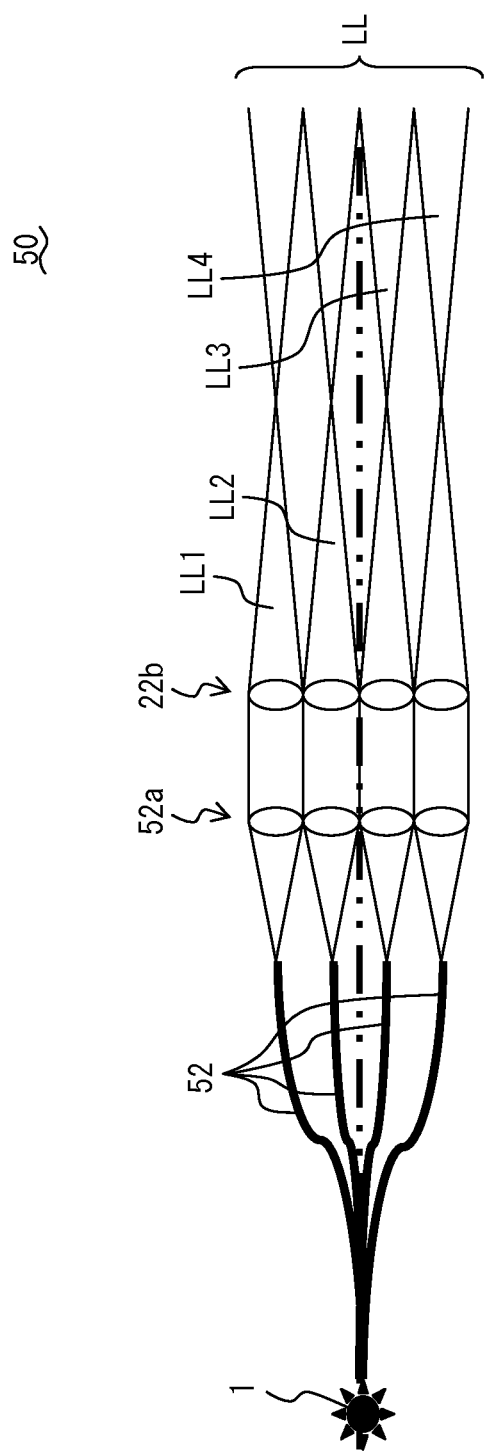
F I G. 1 7

MICROSCOPE DEVICE AND MICROSCOPE SYSTEM

CROSS REFERENCE TO RELATED APPLICATIONS

This application is based upon and claims the benefit of priority from prior Japanese Patent Applications No. 2013-263050, filed Dec. 19, 2013, and No. 2014-114393, filed Jun. 2, 2014, the entire contents of which are incorporated herein by reference.

BACKGROUND OF THE INVENTION

Field of the Invention

The invention discussed herein are related to a microscope device and a microscope system, and more particularly, to a microscope device and a microscope system that capture an image of a specimen illuminated laterally with illumination light in the form of a sheet (hereinafter, also a light sheet).

Description of the Related Art

In the field of fluorescence microscopes, a confocal microscope is well known as a means for generating three-dimensional information of a specimen, and in recent years, a microscope that adopts light sheet illumination that illuminates a specimen laterally with a light sheet (hereinafter, also referred to as a light-sheet microscope) is also known.

Examples of a light-sheet microscope are an SPIM (Selective Plane Illumination Microscope), a DSLM (Digital Scanned Light-sheet Microscope), etc. Japanese National Publication of International Patent Application No. 2006-509246 has disclosed an SPIM that forms illumination light in the form of a sheet by means of a cylindrical lens as an above-described light-sheet microscope.

A light-sheet microscope features less fading and phototoxicity than in the case of a confocal fluorescence microscope. Further, in a confocal fluorescence microscope, if the NA (Numerical Aperture) becomes small during observation, longitudinal resolving power (Z resolving power) deteriorates remarkably compared to transverse resolving power (XY resolving power) as illustrated in FIG. 1 and FIG. 2. Because of this, there may be a case where a sufficiently high longitudinal resolving power cannot be obtained, particularly in macroscopic observation. In contrast to this, in a light-sheet microscope, the longitudinal resolving power is determined by the thickness of illumination in the form of a sheet (i.e., the width in the Z direction), and therefore, it is possible to obtain a sufficiently high longitudinal resolving power even in macroscopic observation.

SUMMARY OF THE INVENTION

One aspect of the present invention provides a microscope device including an illumination optical system that illuminates a specimen with a light sheet, and a stereo image capturing device that captures images of the specimen in a plurality of different directions in which a resolution based on a triangulation method in the Z direction orthogonal to a direction of one or a plurality of light sheets formed on the specimen by the illumination optical system is less than a thickness in the Z direction of light sheet illumination that comprises the one or the plurality of light sheets.

Another aspect of the present invention provides a microscope system including the microscope device in the above-described aspect and an arithmetic operation device that generates three-dimensional information of the specimen on the basis of a plurality of images of the specimen generated by the stereo image capturing device of the microscope device.

BRIEF DESCRIPTION OF THE DRAWINGS

The present invention will be more apparent from the following detailed description when the accompanying drawings are referenced.

FIG. 1 is a diagram illustrating changes in a transverse resolution and in a longitudinal resolution for the NA of a confocal microscope;

FIG. 6 is a diagram illustrating a relationship between a resolution in an X direction of a microscope device and the resolution in the Z direction based on the triangulation method under predetermined conditions;

FIG. 10 is a diagram illustrating a configuration of a shielding member according to the first embodiment;

FIG. 17 is a diagram illustrating a third modified example of the configuration of the illumination device according to the fourth embodiment;

DESCRIPTION OF THE EMBODIMENTS

It is possible to improve the Z resolving power of a light-sheet microscope by reducing the thickness of the light sheet. However, the narrower the thickness of the light sheet is made, the more the number of Z stack images increases, and therefore, it takes time to generate three-dimensional information.

Before explaining each embodiment, features of the present invention of the application common to the invention according to each embodiment are roughly explained. The inventions according to each embodiment are inventions related to a microscope system capable of generating three-dimensional information having a high Z resolving power at a high speed by combining a light sheet illumination technique for illuminating a specimen laterally with a light sheet and a stereo measuring technique for measuring height information from a plurality of images having parallax, and a microscope device that is provided in the microscope system. The invention according to each embodiment is applied mainly to fluorescence observation.

Figure 2:
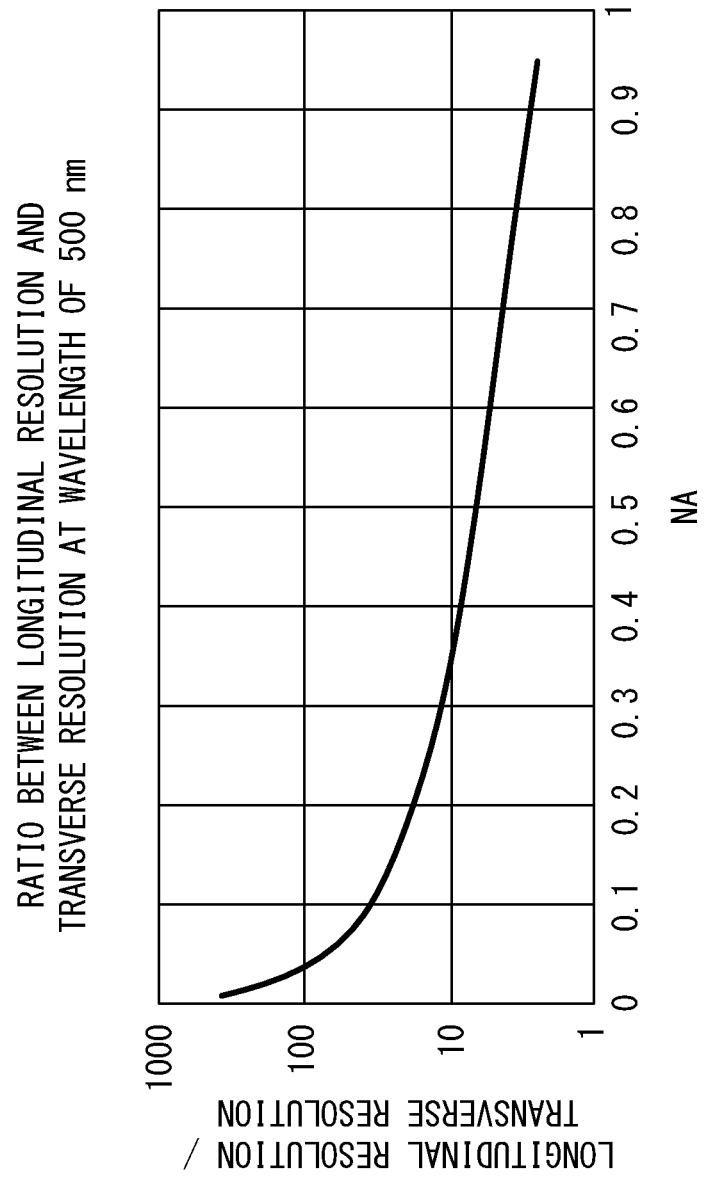
FIG. 2 is a diagram illustrating a change in a longitudinal resolution/transverse resolution for the NA of the confocal microscope.
Figure 3:
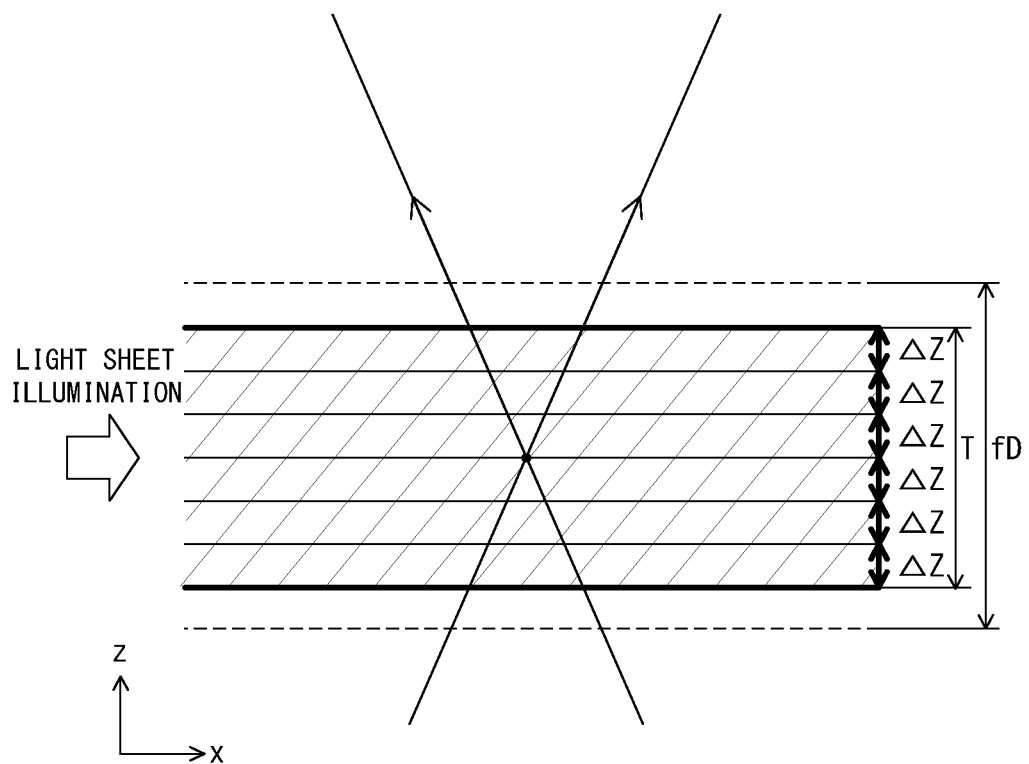
FIG. 3 is a diagram for explaining a relationship between a focal depth of a detection optical system, a thickness in a Z direction of light sheet illumination that comprises a single light sheet, and a resolution in the Z direction based on a triangulation method.
Figure 4:
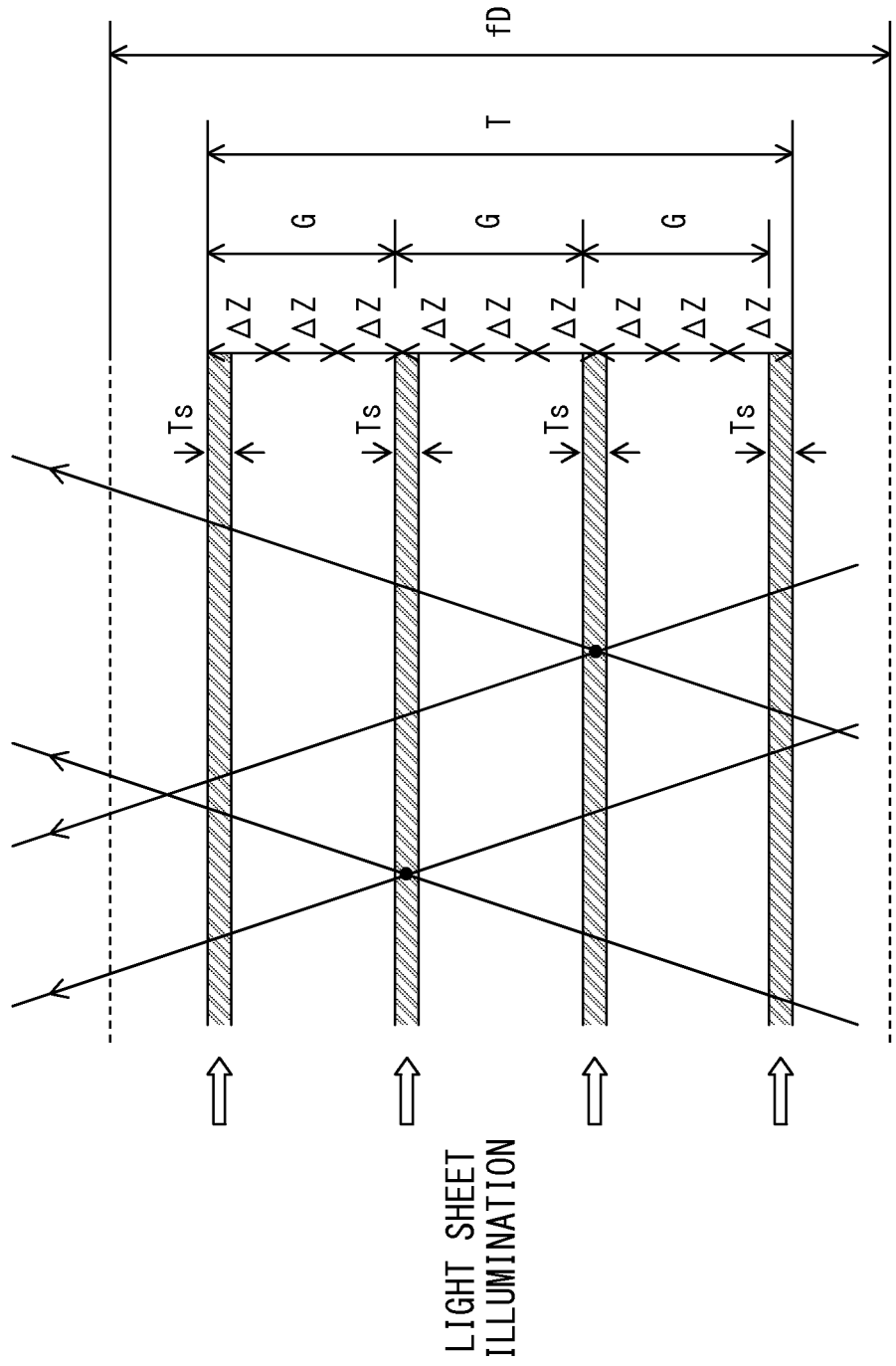
FIG. 4 is a diagram for explaining a relationship between the focal depth of the detection optical system, the thickness in the Z direction of light sheet illumination that comprises a plurality of light sheets, the thickness in the Z direction of each of the plurality of light sheets, a distance between the plurality of light sheets, and a resolution in the Z direction based on the triangulation method.

In each embodiment, an illumination optical system illuminates a specimen with a light sheet. At this time, in a first embodiment to a third embodiment, a thickness T in a Z direction (direction orthogonal to the illumination direction) of light sheet illumination that comprises a single light sheet is set to a focal depth fD or less of a detection optical system as illustrated in FIG. 3. In a fourth embodiment to a sixth embodiment, the thickness T in the Z direction of light sheet illumination that comprises a plurality of light sheets is set to the focal depth fD or less of the detection optical system as illustrated in FIG. 4. Due to this, fluorescence is produced only from within the range of the focal depth fD, and therefore, it is possible to avoid unnecessary light from the range beyond the focal depth fD from being detected. Because of this, according to the invention based on each embodiment, it is possible to acquire a fluorescence image with a high S/N ratio. The thickness in the Z direction of light sheet illumination that comprises a plurality of light sheets is a distance between the light sheet located at the highest position of the plurality of light sheets aligned in the Z direction and the light sheet located at the lowest position, as illustrated in FIG. 4.

Further, in each embodiment, the stereo image capturing device including a detection optical system captures images of a specimen in a plurality of different directions. At this time, the plurality of directions are set to directions in which a resolution $\Delta Z$ in the Z direction based on the triangulation method is less than the thickness T in the Z direction of light sheet illumination (i.e., the resolving power becomes higher) as illustrated in FIG. 3 and FIG. 4. Due to this, according to the invention based on each embodiment, it is possible to generate three-dimensional information of a specimen having the resolving power in the Z direction greater than resolving power corresponding to the thickness T of light sheet illumination by performing pattern matching of the images of the specimen captured in a plurality of directions.

In the first embodiment to the third embodiment, attention is focused on the fact that the thickness of light sheet illumination does not need to be thinned excessively in order to obtain a high Z resolving power because it is possible to obtain a high Z resolving power by using the stereo measuring technique. In view of this, in the first embodiment to the third embodiment, examples are illustrated in which a single light sheet illumination whose thickness has been increased compared to that of conventional light sheet illumination is formed on a specimen. In these embodiments, it is possible to increase the thickness of the light sheet illumination to a thickness substantially the same as the focal depth as long as the thickness is equal to or less than the focal depth. Because of this, it is made possible to considerably reduce the number of times of light sheet illumination (i.e., number of Z stack times) compared to the conventional number of times. Due to this, according to the inventions based on the first embodiment to the third embodiment, it is possible to generate three-dimensional information at a high speed because the number of times of image capturing can be reduced.

The main purpose of conventional light sheet illumination is to obtain a high Z resolving power, and therefore, the light sheet illumination is usually formed as thinly as possible in order to obtain a high Z resolving power. On the other hand, the main purpose of the light sheet illumination of the inventions according to the first embodiment to the third embodiment is to prevent the occurrence of unnecessary fluorescence from the range beyond the focal depth by taking into consideration the fact that the S/N ratio is generally degraded if stereo measurement is performed by using a fluorescence microscope because light beyond the focal depth forms background light. Consequently, in the case of the light sheet illumination of the inventions according to the first embodiment to the third embodiment, it is possible to set the thickness of the light sheet to any thickness as long as the thickness is equal to or less than the focal depth of the detection optical system. Because of this, in order to reduce the number of Z stack times, the thickness of the light sheet illumination is positively increased to a thickness substantially the same as the focal depth in the range of the focal depth or less of the detection optical system. More specifically, it is desirable to set the thickness of the light sheet illumination to a thickness of ½ or more of the focal depth. As described above, resulting from the fact that the purpose of the light sheet illumination of the inventions according to the first embodiment to the third embodiment differs considerably from the purpose of conventional light sheet illumination, the thickness of the illumination differs considerably from the thickness of conventional light sheet illumination.

Figure 5:
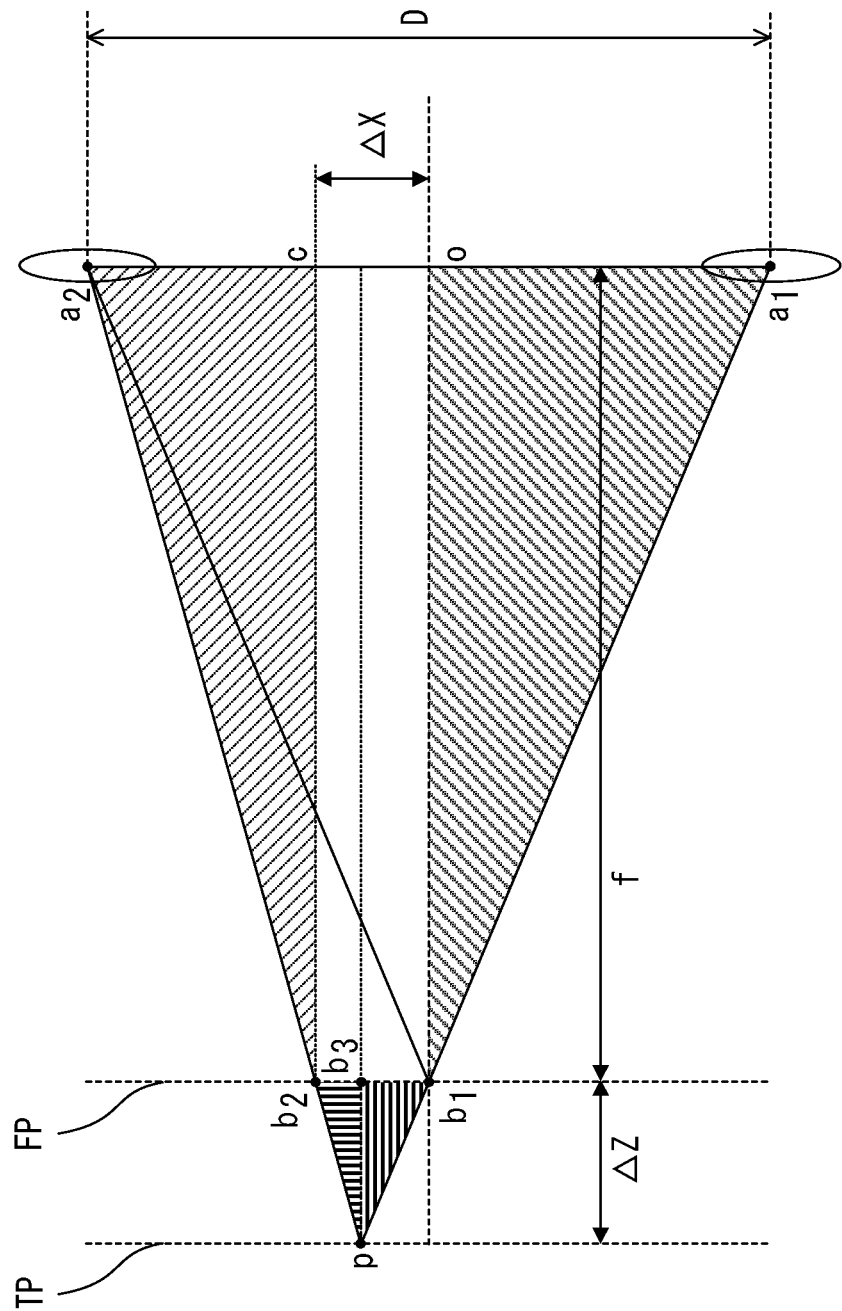
FIG. 5 is a diagram for explaining a method for calculating the resolution in the Z direction based on the triangulation method.

Next, with reference to FIG. 5, conditions for obtaining the resolving power in the Z direction greater than the resolving power corresponding to the thickness T of light sheet illumination are explained. FIG. 5 is a diagram for explaining a method for calculating the resolution $\Delta Z$ in the Z direction based on the triangulation method. A plane TP indicates a plane on which an observation target p in a specimen exists and a plane FP indicates a focal plane of a detection optical system conjugate with an image capturing plane (light receiving plane). A point $a_1$ and a point $a_2$ respectively indicate positions of the detection optical system when images of a specimen are captured in different directions. When the detection optical system is located at the point $a_1$, an image of the observation target p is captured as if the observation target p were located at a position $b_1$ and when the detection optical system is located at the point $a_2$, an image of the observation target p is captured as if the observation target p were located at a position $b_2$.

In FIG. 5, a triangle $pb_2b_3$ and a triangle $b_2a_2c$ are similar to each other and a triangle $pb_1b_3$ and a triangle $b_1a_1o$ are similar to each other, and therefore, a triangle $pb_2b_1$ and a triangle combining hatched portions (a combination of the triangle $b_2a_2c$ and the triangle $b_1a_1o$) are also similar to each other. Consequently, between the resolution $\Delta Z$ in the Z direction based on the triangulation method and the resolution $\Delta X$ in the X direction of the microscope device, the relationship below will hold by using a baseline length D and a focal length f of the detection optical system. The resolution $\Delta X$ in the X direction of the microscope device is a resolution that is determined by the resolution in the X direction of the detection optical system and the pixel pitch of the image capturing device.

$$\Delta Z : \Delta X = f : (D - \Delta X)$$

Because of this, the resolution $\Delta Z$ in the Z direction is expressed by expression (1) below.

$$\Delta Z = \Delta X \times f / (D - \Delta X) \qquad (1)$$

Consequently, in order to obtain the resolving power (corresponding to the resolution $\Delta Z$ (<T)) in the Z direction greater than the resolving power corresponding to the thickness T of the light sheet illumination, it is sufficient to perform settings so as to satisfy the expression below.

$$T > \Delta X \times f / (D - \Delta X) \qquad (2)$$

The resolution in the Z direction of the inventions according to the first embodiment to the third embodiment and the resolution in the Z direction of a confocal fluorescence microscope are compared. FIG. 6 is a diagram illustrating the relationship between the resolution in the X direction of the microscope device and the resolution in the Z direction based on the triangulation method under predetermined conditions, and here, the predetermined conditions are as follows: focal length f of the detection optical system=100 mm and baseline length D=25 mm.

Under these conditions, as illustrated in FIG. 6, if the microscope device has a resolution in the X direction of 5 μm, it is possible to obtain a resolution in the Z direction of about 20 μm by the triangulation method. In contrast to this, in the case of a confocal fluorescence microscope, at the general excitation wavelength and the fluorescence wavelength (the excitation wavelength is 488 nm and the fluorescence wavelength is 510 nm), if the resolution in the X direction is about 3.7 μm, the confocal fluorescence microscope has a resolution in the Z direction of about 271 μm. From this, it is known that by means of the inventions according to the first embodiment to the third embodiment, it is possible to obtain a resolving power in the Z direction higher by an order of magnitude or more than that of a confocal microscope device having substantially the same resolution in the X direction.

The fourth embodiment to the sixth embodiment focus on the fact that it is possible to identify from which light sheet detected light results in a case where a plurality of light sheets are formed on a specimen by using the stereo measuring technique. In view of this, the fourth embodiment to the sixth embodiment illustrate examples in which a plurality of light sheets each having a thickness of about the same as or less than the thickness of a conventional light sheet are formed on a specimen. In these embodiments, it is possible to identify the detected light resulting from each light sheet only in a case where the Z resolution based on the triangulation method is less than the distance between the light sheets (i.e., resolving power is high). Because of this, it is made possible to simultaneously form a plurality of light sheets on a specimen. Due to this, by means of the inventions according to the fourth to the sixth embodiments, it is possible to generate three-dimensional information at a high speed with a small number of times of illumination even if the thickness of each light sheet is thin.

Further, in the fourth embodiment to the sixth embodiment, the thickness of each light sheet can be reduced, and therefore, it is possible to secure a high Z resolving power by illumination. Consequently, the Z resolution based on the stereo measuring technique needs only to be less than the distance between the light sheets and an excessively high resolving power is not required. Because of this, the inventions according to the fourth embodiment to the sixth embodiment are particularly effective when the baseline length cannot be increased so much.

Hereinafter, each embodiment is explained specifically.

First Embodiment

Figure 7:
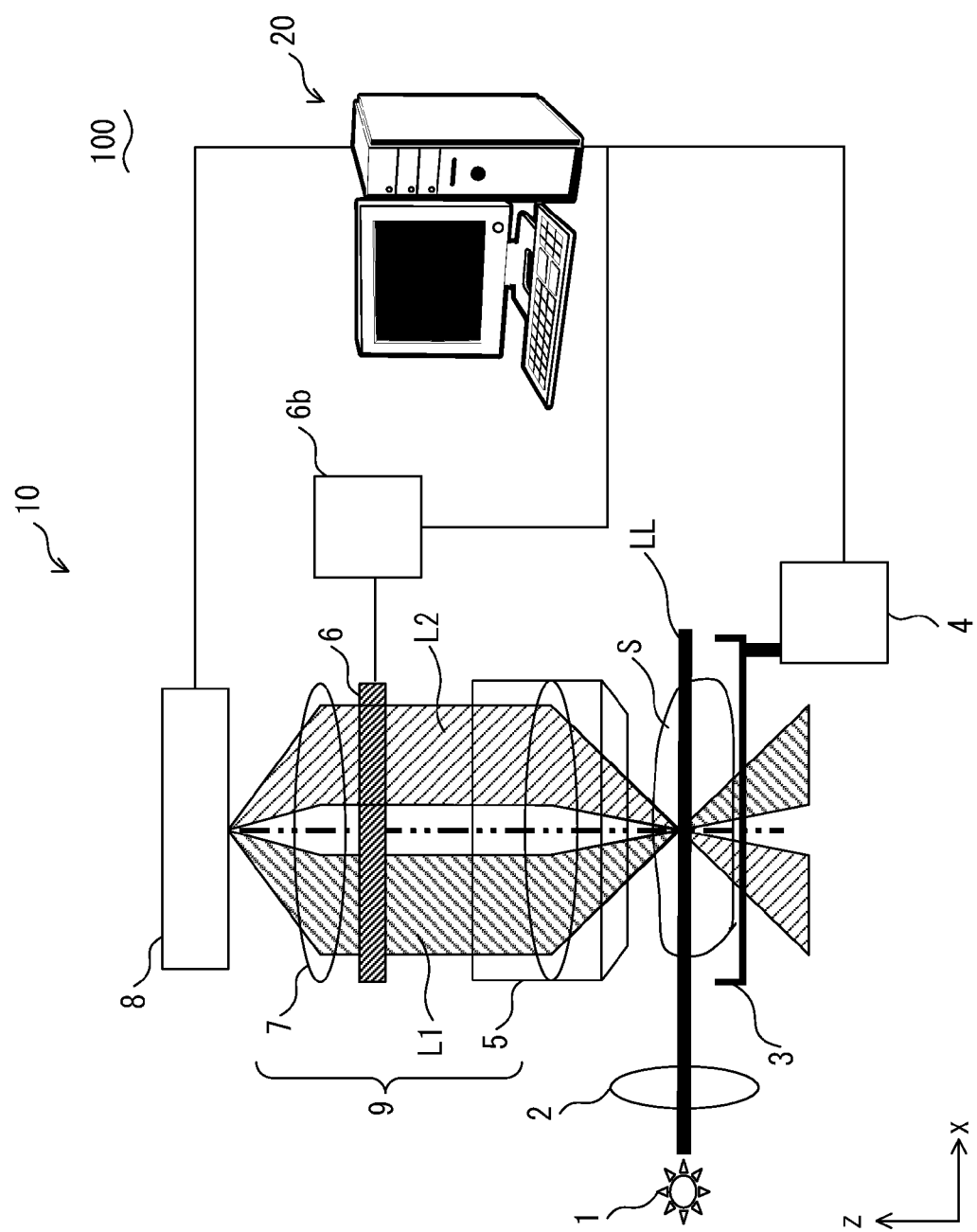
FIG. 7 is a diagram illustrating a configuration of a microscope system according to a first embodiment.

FIG. 7 is a diagram illustrating a configuration of a microscope system 100 according to the present embodiment. The microscope system 100 illustrated in FIG. 7 includes a microscope device 10, which is a fluorescence microscope adopting light sheet illumination, and a control analysis device 20.

The microscope device 10 includes a light source 1, an illumination optical system 2 that illuminates a specimen S with a light sheet, a specimen holder 3 that holds the specimen S, a Z drive mechanism 4 that moves the specimen holder 3 in a Z direction, and a stereo image capturing device that captures images of the specimen S in a plurality of different directions. Different directions refer to directions whose three-dimensional vectors (x, y, z) indicating a direction are different in the case where a direction in which light of a light sheet illumination LL travels (i.e., an illumination direction) is taken to be an X direction, a direction in parallel to the plane formed by the light sheet illumination LL and orthogonal to the X direction is taken to be a Y direction, and the thickness direction of the light sheet illumination LL is taken to be the Z direction.

The light source 1 is a light source that emits light having an excitation wavelength that excites the specimen S. The light source 1 is, for example, a laser light source and may be a fiber light source that is connected to the microscope main body by an optical fiber.

Figure 8:
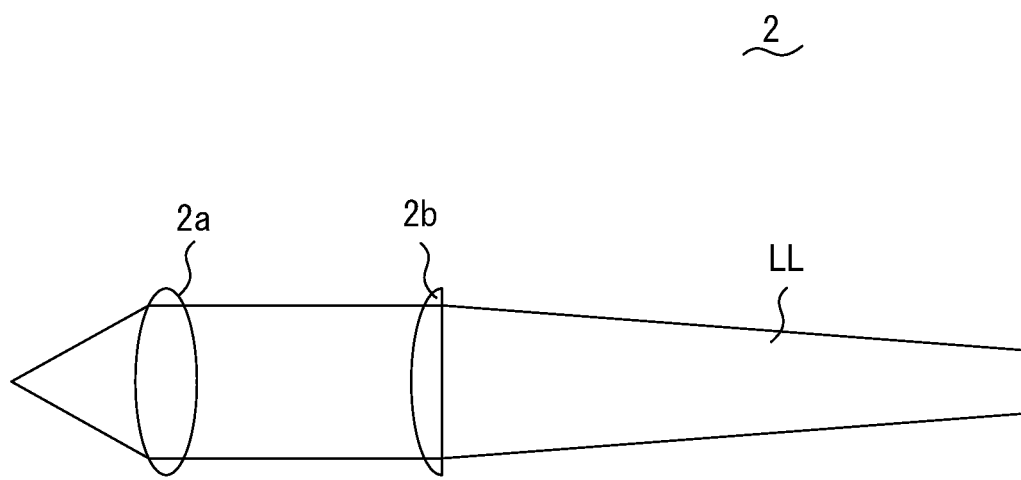
FIG. 8 is a diagram illustrating a configuration of an illumination optical system according to the first embodiment.

The illumination optical system 2 includes a collimator lens 2a that collimates light from the light source 1, and a cylindrical lens 2b, as illustrated in FIG. 8. The illumination optical system 2 changes parallel light into light in the form of a sheet (light sheet) in the cylindrical lens 2b and irradiates the specimen S with the light. The illumination optical system 2 forms the light sheet illumination LL that comprises the light sheet on the specimen S, whose thickness is equal to or less than the focal depth of a detection optical system 9, in particular, and about the focal depth, specifically, ½ or more of the focal depth.

The Z drive mechanism 4 is connected to the control analysis device 20 and moves the specimen holder 3 in the Z direction in accordance with a control signal from the control analysis device 20. Specifically, the Z drive mechanism 4 moves the specimen holder 3 in the Z direction so that the Z stack interval will become about the same as the thickness of the light sheet illumination LL.

Figure 9:
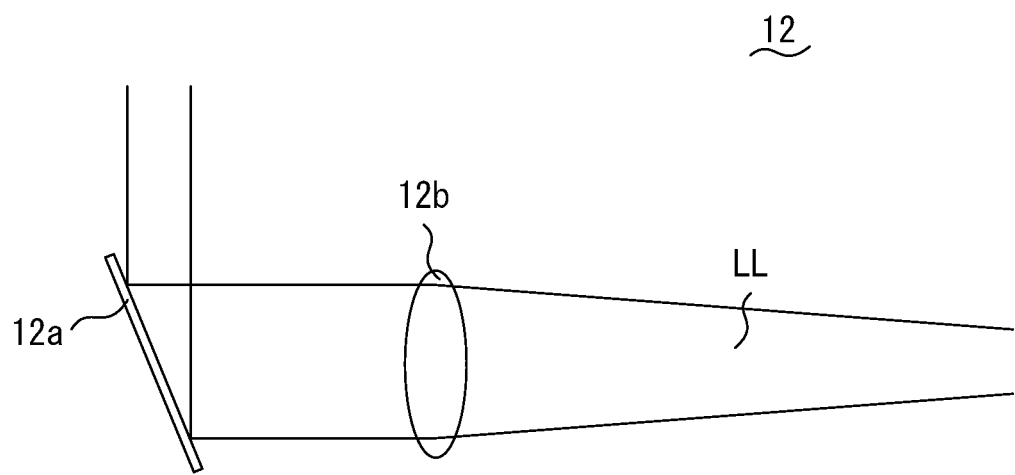
FIG. 9 is a diagram illustrating a modified example of the configuration of the illumination optical system according to the first embodiment.

The microscope device 10 is only required to include an illumination optical system that illuminates the specimen S with a light sheet, and may include an illumination optical system 12 illustrated in FIG. 9 in place of the illumination optical system 2 including the cylindrical lens 2b. The illumination optical system 12 includes a galvanometer mirror 12a and an fθ lens 12b. The galvanometer mirror 12a is a scanner device that forms the light sheet illumination LL on the specimen S by changing the direction of light with which the specimen S is irradiated to a direction (e.g., Y direction) orthogonal to the Z direction. The microscope device 10 may include another scanner device, such as a polygon mirror, in place of the galvanometer mirror 12a, and may include another scan lens in place of the fθ lens 12b. The illumination optical system 12 resembles the illumination optical system 2 informing the light sheet illumination LL on the specimen S, whose thickness is equal to or less than the focal depth of the detection optical system 9, in particular, and is about the focal depth, specifically, ½ or more of the focal depth.

As illustrated in FIG. 7, the stereo image capturing device includes a CCD camera 8, which is an image capturing device that captures an image of the specimen S, the detection optical system 9 that forms an optical image of the specimen S on the CCD camera 8, an aperture 6, which is a shielding member that partially shields fluorescence from the specimen S, which enters the pupil of the detection optical system 9, and a drive device 6b that drives the aperture 6.

The CCD camera 8 is an image capturing device having a light receiving plane at a position conjugate with the focal plane of the detection optical system 9 and including a two-dimensional image sensor (CCD image sensor). The CCD camera 8 is connected to the control analysis device 20 and outputs an image of the specimen S to the control analysis device 20. Further, the CCD camera 8 is arranged so that the light receiving plane of the two-dimensional image sensor will be parallel to the plane (XY plane) of the light sheet illumination formed on the specimen S by the illumination optical system 2.

The detection optical system 9 includes an infinity-corrected objective 5 and a tube lens 7.

As illustrated in FIG. 10, the aperture 6 is an aperture capable of moving the position of an opening 6a in a direction orthogonal to the optical axis of the detection optical system 9 and is arranged at the pupil position of the detection optical system 9. The aperture 6 may be a variable aperture whose opening diameter can vary or a fixed aperture whose opening diameter is fixed at a predetermined size. The drive device 6b is connected to the control analysis device 20 and moves the position of the opening 6a in the direction orthogonal to the optical axis in accordance with a control signal from the control analysis device 20.

When the control analysis device 20 moves the opening 6a of the aperture 6 to predetermined positions in a sequential order, the stereo image capturing device captures an image of the specimen S at each predetermined position. In this manner, the stereo image capturing device captures images of the specimen S in a plurality of different directions. In other words, the stereo image capturing device captures images of the specimen S in a plurality of states where the range of the pupil of the detection optical system 9, in which fluorescence from the specimen S is shielded by the aperture 6, is different. Here, the plurality of different states refers to the following states. The thickness T in the Z direction of the sheet illumination LL is assumed to be the resolution ΔZ in the Z direction based on the triangulation method. At this time, the plurality of different states are such states where the distance between the centers of a plurality of light fluxes (e.g., light flux L1 and light flux L2 in FIG. 7) passing through the aperture 6 in the plurality of different states when the light fluxes pass through the principal plane of the detection optical system 9 is longer than the baseline length D of the triangulation method which is calculated from the focal length f of the detection optical system 9, the resolution ΔZ in the Z direction, and a resolution ΔX of the microscope device 10 in the direction orthogonal to the Z direction.

Due to this, the stereo image capturing device functions as a unit configured to capture images of the specimen S in a plurality of different directions in which the resolution ΔZ in the Z direction based on the triangulation method is less than the thickness T in the Z direction of the light sheet illumination LL.

Figure 11:
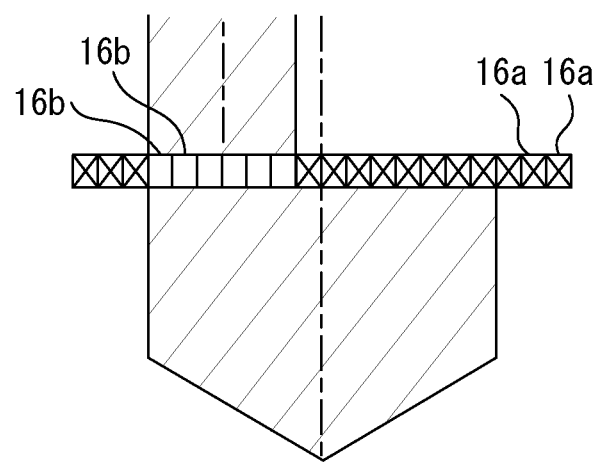
FIG. 11 is a diagram illustrating a modified example of the configuration of the shielding member according to the first embodiment.

The microscope device 10 only needs to include a shielding member and may include a liquid crystal device 16 illustrated in FIG. 11 in place of the aperture 6, in which case, the drive device 6b is a drive device for driving the liquid crystal device 16. The liquid crystal device 16 is a liquid crystal device including a plurality of pixel elements (pixel element 16a, pixel element 16b) aligned in the direction (XY direction) orthogonal to the optical axis of the detection optical system 9. Each pixel element is individually controlled into either a state of transmitting incident light or a state of shielding incident light in accordance with a control signal from the control analysis device 20, which is output to the drive device 6b. In FIG. 11, a pixel element in the state of transmitting incident light is represented by the pixel element 16b and a pixel element in the state of shielding incident light is represented by the pixel element 16a.

In the case where the liquid crystal device 16 is used in place of the aperture 6, the control analysis device 20 controls the liquid crystal device 16 to form an opening (i.e., a pixel element in the state of transmitting incident light) of the liquid crystal device 16 at predetermined positions in a sequential order and the stereo image capturing device captures an image of the specimen S at each predetermined position. Due to this, the stereo image capturing device captures images of the specimen S in a plurality of different directions, i.e., in a plurality of states where the range of the pupil of the detection optical system 9, in which fluorescence from the specimen S is shielded by the liquid crystal device 16, is different.

The control analysis device 20 is a computer including a processor that executes a program stored in a memory and is also a control device that controls the microscope device 10. Further, the control analysis device 20 is an arithmetic operation device that generates three-dimensional information of the specimen S having the Z resolution less than the thickness T in the Z direction of the light sheet illumination (i.e., high Z resolving power) on the basis of the plurality of images of the specimen S generated by the stereo image capturing device, as well as being a control device.

More specifically, the control analysis device 20 performs pattern matching processing on a plurality of images of the specimen S output from the CCD camera 8. Further, the control analysis device 20 generates information on the height of the region of the matched image by the triangulation method. In this manner, the control analysis device 20 generates three-dimensional information of the specimen S by the triangulation method from a plurality of images of the specimen S, more specifically, three-dimensional information of the specimen S within the range of the illumination LL. Further, by performing this processing each time the specimen holder 3 is moved in the Z direction by the Z stack interval by using the Z drive mechanism 4, it is possible for the control analysis device 20 to generate three-dimensional information of the whole of the specimen S.

The control analysis device 20 may further generate images (right-eye image and left-eye image) for viewing the specimen S three-dimensionally from the generated three-dimensional information of the specimen S, and may output the generated right-eye image and left-eye image to a display device.

By means of the microscope system 100 configured as above, it is possible to generate three-dimensional information having a high Z resolving power at a high speed. Further, by means of the microscope device 10, it is possible to provide a plurality of images from which three-dimensional information having a high Z resolving power can be generated to the control analysis device 20 in a brief time.

Second Embodiment

Figure 12:
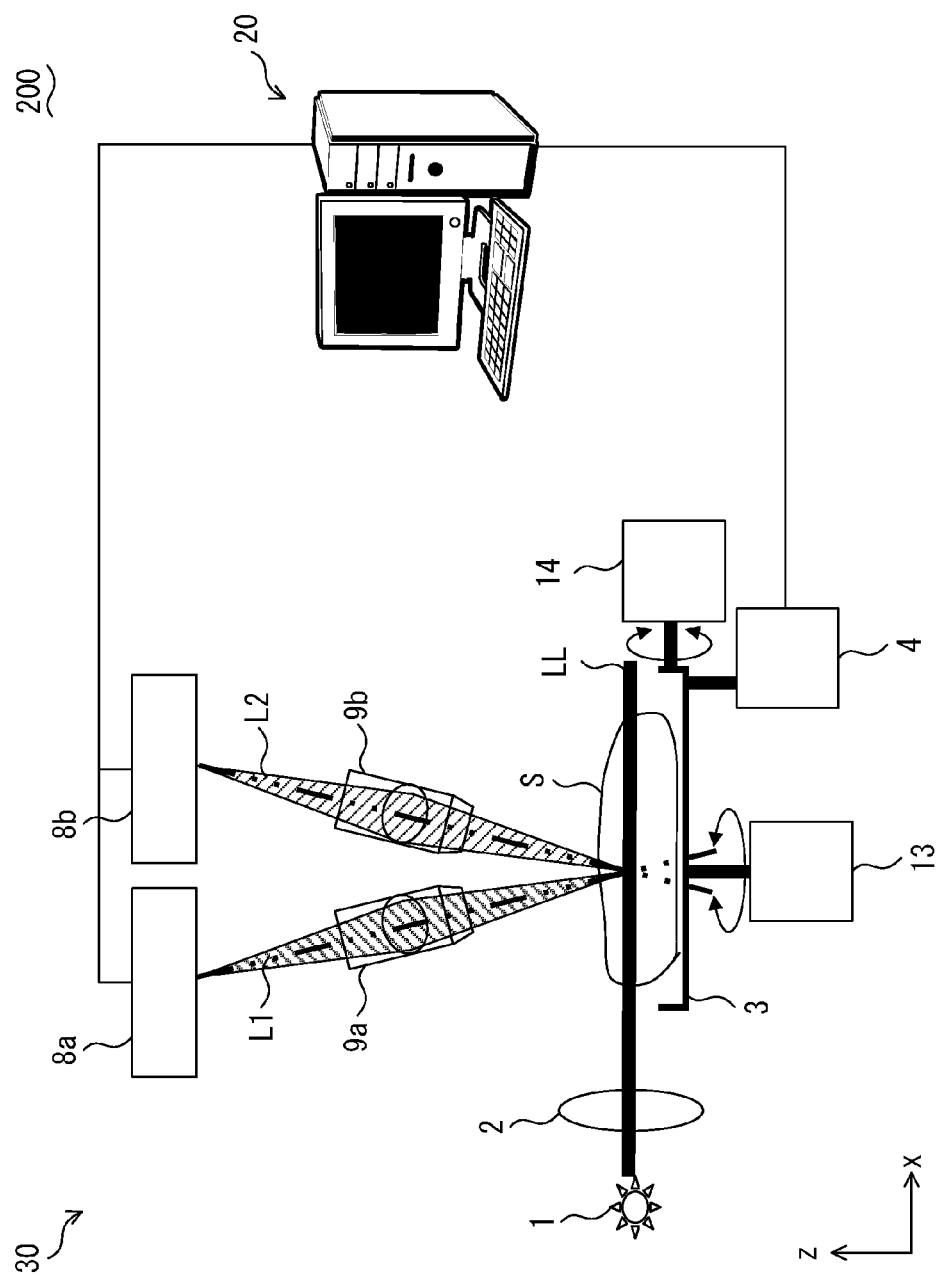
FIG. 12 is a diagram illustrating a configuration of a microscope system according to a second embodiment.

FIG. 12 is a diagram illustrating a configuration of a microscope system 200 according to the present embodiment. The microscope system 200 illustrated in FIG. 12 differs from the microscope system 100 according to the first embodiment in including a microscope device 30 in place of the microscope device 10.

The microscope device 30 resembles the microscope device 10 according to the first embodiment in including the light source 1, the illumination optical system 2 that illuminates the specimen S with light sheet, the specimen holder 3 that holds the specimen S, and the Z drive mechanism 4 that moves the specimen holder 3 in the Z direction.

The microscope device 30 differs from the microscope device 10 in including a specimen rotation mechanism 13 that rotates the specimen holder 3 about the Z axis and a specimen rotation mechanism 14 that rotates the specimen S about the X axis. By rotating the specimen holder 3 by using the specimen rotation mechanism 13 and the specimen rotation mechanism 14 to change the orientation of the specimen S, it is possible to cause a light sheet to enter in a direction in which a shadow is not produced easily.

Further, the microscope device 30 resembles the microscope device 10 according to the first embodiment in including the stereo image capturing device that captures images of the specimen S in a plurality of different directions, but the structure of the stereo image capturing device is different from that of the stereo image capturing device of the microscope device 10.

As illustrated in FIG. 12, the stereo image capturing device of the microscope device 30 includes a plurality of CCD cameras (CCD camera 8a and CCD camera 8b) for capturing images of the specimen S and a plurality of detection optical systems (detection optical system 9a and detection optical system 9b) whose optical axis directions are different. Each of the detection optical system 9a and the detection optical system 9b includes an objective and a tube lens and forms an optical image of the specimen S on each of the different CCD cameras of the plurality of CCD cameras. Specifically, the detection optical system 9a forms an optical image of the specimen S on the CCD camera 8a and the detection optical system 9b forms an optical image of the specimen S on the CCD camera 8b.

Each of the CCD camera 8a and the CCD camera 8b is an image capturing device including a two-dimensional image sensor (CCD image sensor) having a light receiving plane at a position conjugate with the focal plane of each of the detection optical system 9a and the detection optical system 9b. The CCD camera 8a and the CCD camera 8b resemble the CCD camera 8 according to the first embodiment in being connected to the control analysis device 20 to output an image of the specimen S to the control analysis device 20 and in being arranged so that the light receiving plane of each two-dimensional image sensor becomes parallel to the plane (XY plane) of the light sheet illumination formed on the specimen S by the illumination optical system 2.

The stereo image capturing device captures optical images of the specimen S projected by a plurality of detection optical systems (detection optical system 9a and detection optical system 9b) by using a plurality of CCD cameras (CCD camera 8a and CCD camera 8b), and thereby captures images of the specimen S in a plurality of different directions. The plurality of detection optical systems (detection optical system 9a and detection optical system 9b) are arranged as follows. The thickness T in the Z direction of the light sheet illumination LL is assumed to be the resolution ΔZ in the Z direction based on the triangulation method. At this time, the plurality of detection optical systems are arranged so that the distance between the principal points of the plurality of detection optical systems is longer than the baseline length D of the triangulation method which is calculated from the focal length f of the plurality of detection optical systems, the resolution ΔZ in the Z direction, and the resolution ΔX of the microscope device 30 in the direction orthogonal to the Z direction.

Due to this, the stereo image capturing device functions as a unit configured to capture images of the specimen S in a plurality of different directions in which the resolution ΔZ in the Z direction based on the triangulation method is less than the thickness T in the Z direction of the light sheet illumination LL.

By means of the microscope system 200 configured as above, it is also possible to generate three-dimensional information having a high Z resolving power at a high speed as in the case of the microscope system 100 according to the first embodiment. Further, by means of the microscope device 30, it is also possible to provide a plurality of images from which three-dimensional information having a high Z resolving power can be generated to the control analysis device 20 in a brief time as in the case of the microscope device 10 according to the first embodiment.

Furthermore, it is possible for the microscope device 30 to simultaneously capture images of the specimen S in a plurality of different directions. Because of this, by means of the microscope device 30, it is possible to provide a plurality of images from which three-dimensional information having a high Z resolving power can be generated to the control analysis device 20 in a time briefer than the time in the case of the microscope device 10 according to the first embodiment. Consequently, by means of the microscope system 200, it is possible to generate three-dimensional information having a high Z resolving power at a speed higher than that in the case of the microscope system 100 according to the first embodiment.

Third Embodiment

Figure 13:
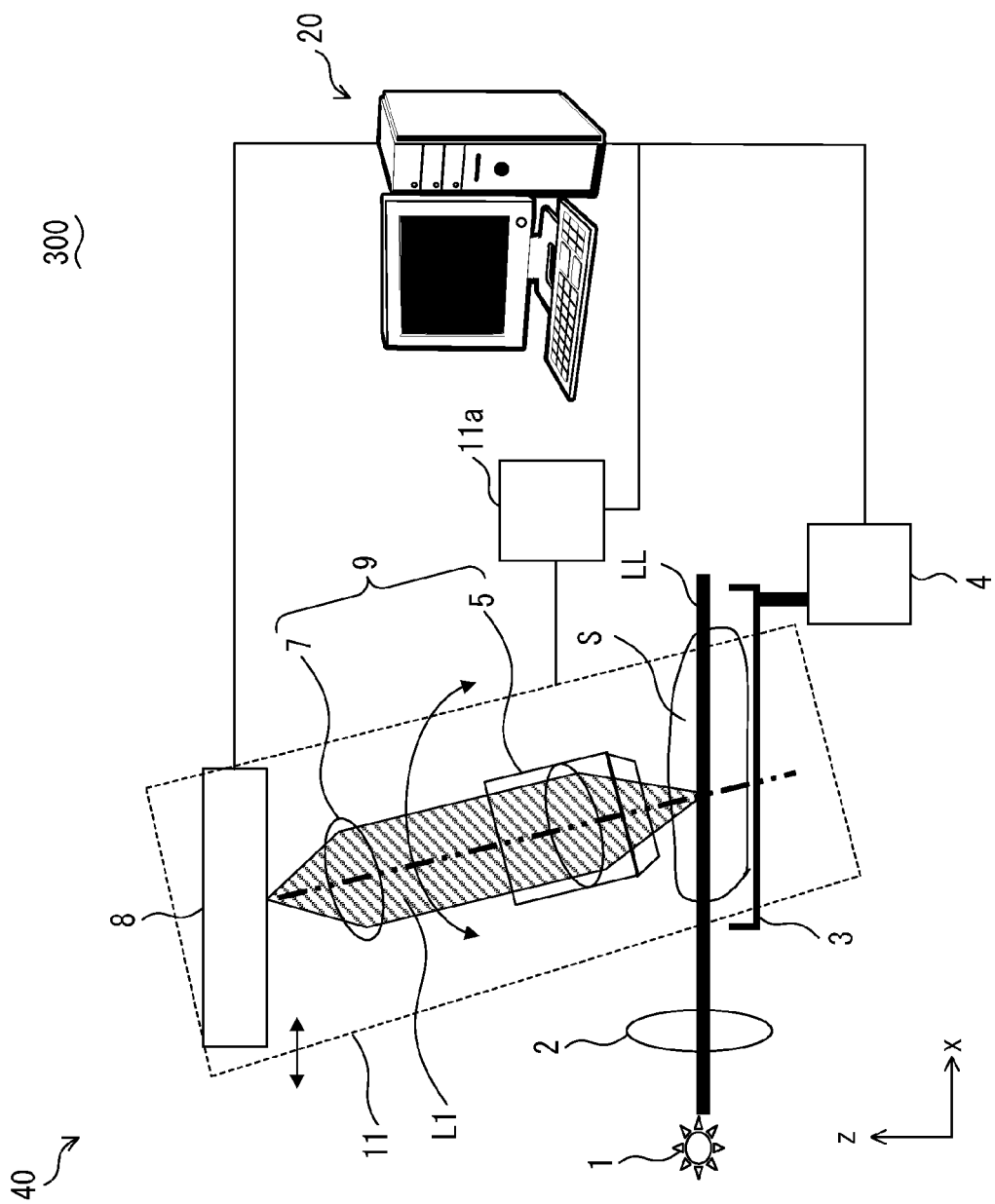
FIG. 13 is a diagram illustrating a configuration of a microscope system according to a third embodiment.

FIG. 13 is a diagram illustrating a configuration of a microscope system 300 according to the present embodiment. The microscope system 300 illustrated in FIG. 13 differs from the microscope system 100 according to the first embodiment in including a microscope device 40 in place of the microscope device 10.

The microscope device 40 resembles the microscope device 10 according to the first embodiment in including the light source 1, the illumination optical system 2 that illuminates the specimen S with a light sheet, the specimen holder 3 that holds the specimen S, and the Z drive mechanism 4 that moves the specimen holder 3 in the Z direction.

Further, the microscope device 40 resembles the microscope device 10 according to the first embodiment in including the stereo image capturing device that captures images of the specimen S in a plurality of different directions, but the structure of the stereo image capturing device is different from that of the stereo image capturing device of the microscope device 10.

The stereo image capturing device of the microscope device 40 resembles that of the microscope device 10 according to the first embodiment in including the CCD camera 8 that captures an image of the specimen S and the detection optical system 9 that forms an optical image of the specimen S on the CCD camera 8. The microscope device 40 differs from the microscope device 10 according to the first embodiment in including an angle varying mechanism 11 and a drive device 11a in place of the aperture 6 and the drive device 6.

The angle varying mechanism 11 is a mechanism that mechanically moves the detection optical system 9 and the CCD camera 8. The angle varying mechanism 11 moves the detection optical system 9 so as to change the direction of the optical axis of the detection optical system 9 without moving the focal position of the detection optical system 9. Further, the angle varying mechanism 11 is also a mechanism that moves the CCD camera 8 accompanying movement of the detection optical system 9 so that the CCD camera 8 is located on the optical axis of the detection optical system 9 after the movement. The angle varying mechanism 11 slides the CCD camera 8 so that the parallel relationship between the light receiving plane of the CCD camera 8 (two-dimensional image sensor) and the plane (XY plane) of the light sheet illumination LL is maintained.

The drive device 11a is a drive device that drives the angle varying mechanism 11. The drive device 11a is connected to the control analysis device 20 and drives the angle varying mechanism 11 so as to change the direction of the optical axis of the detection optical system 9 in accordance with a control signal from the control analysis device 20.

When the control analysis device 20 moves the direction of the optical axis of the detection optical system 9 to predetermined directions in a sequential order, the stereo image capturing device captures an image of the specimen S in each predetermined direction. In this manner, the stereo image capturing device captures images of the specimen S in a plurality of different directions. In other words, the stereo image capturing device captures images of the specimen S in a plurality of states where the direction of the optical axis of the detection optical system 9 is different. Here, the plurality of different states refers to the following states. The thickness T in the Z direction of the light sheet illumination is assumed to be the resolution ΔZ in the Z direction based on the triangulation method. At this time, the plurality of different states are such states where the distance between the principal points of the detection optical system 9 in the plurality of different states is longer than the baseline length D of the triangulation method which is calculated from the focal length f of the detection optical system 9, the resolution ΔZ in the Z direction, and the resolution ΔX in the direction orthogonal to the Z direction of the microscope device 40.

Due to this, the stereo image capturing device functions as a unit configured to capture images of the specimen S from a plurality of different directions in which the resolution ΔZ in the Z direction based on the triangulation method is less than the thickness T in the Z direction of the light sheet illumination LL.

By means of the microscope system 300 configured as above, it is also possible to generate three-dimensional information having a high Z resolving power at a high speed as in the case of the microscope systems according to the first embodiment and the second embodiment. Further, by means of the microscope device 40, it is also possible to provide a plurality of images from which three-dimensional information having a high Z resolving power can be generated in a brief time as in the case of the microscope devices according to the first embodiment and the second embodiment.

Further, in the microscope device 10 according to the first embodiment, part of the fluorescence incident on the pupil position is shielded, but in the microscope device 40, all of the light flux of the fluorescence incident on the pupil of the detection optical system 9 enters the CCD camera 8. Furthermore, in the microscope device 30 according to the second embodiment, a plurality of detection optical systems are arranged while maintaining a baseline length by which a sufficient resolution in the Z direction is obtained, and therefore, the lens diameter of each detection optical system is limited, but in the microscope device 40, it is possible to use a larger lens. Because of this, by means of the microscope device 40 and the microscope system 300, it is possible to obtain a brighter fluorescence image.

The microscope device 40 adopts a configuration in which the direction of the optical axis of the single detection optical system 9 is changed, and therefore, the baseline length is less restricted compared to the microscope device 30 according to the second embodiment. Consequently, by means of the microscope device 40 and the microscope system 300, it is possible to implement a higher Z resolving power by adopting a longer baseline length.

Fourth Embodiment

Figure 14:
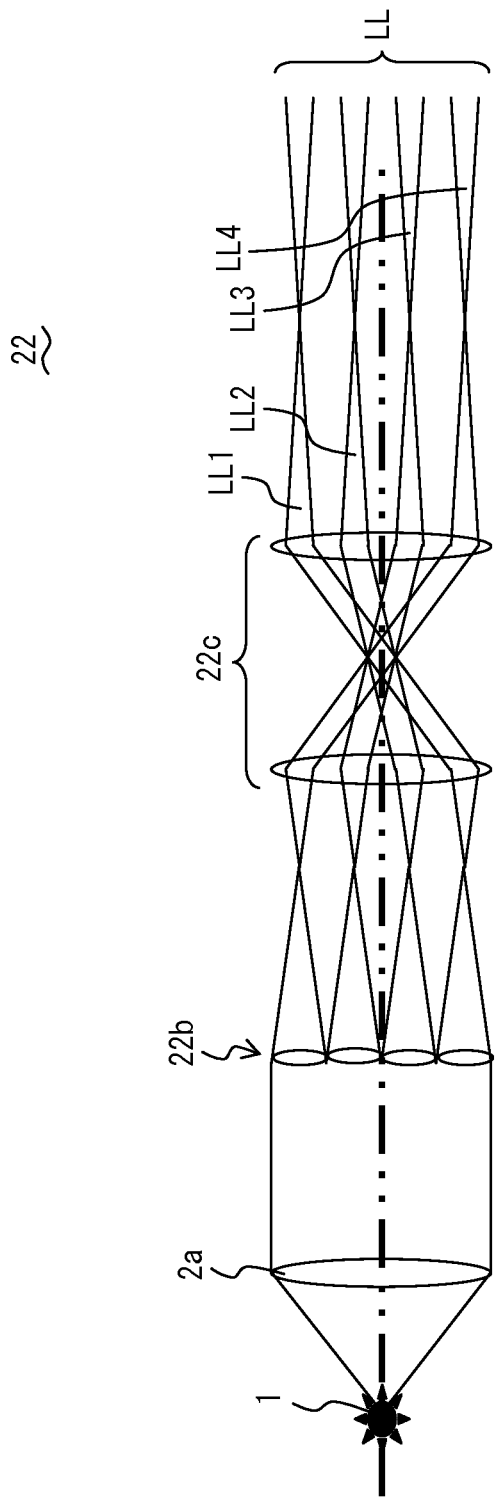
FIG. 14 is a diagram illustrating a configuration of an illumination device according to a fourth embodiment.

FIG. 14 is a diagram illustrating a configuration of an illumination device according to the present embodiment. The microscope system according to the present embodiment differs from the microscope system 100 according to the first embodiment in including an illumination device 22 illustrated in FIG. 14 in place of the light source 1 and the illumination optical system 2.

The illumination device 22 includes the light source 1 and an illumination optical system. The illumination optical system according to the present embodiment resembles the illumination optical system 2 of the microscope system 100 in including the collimator lens 2a. However, the illumination optical system differs from the illumination optical system 2 of the microscope system 100 in including a cylindrical lens array 22b and a relay system 22c in place of the cylindrical lens 2b.

In the microscope system according to the present embodiment, light from the light source 1 is converted into parallel light by the collimator lens 2a and enters a plurality of cylindrical lenses constituting the cylindrical lens array 22b. Then, the light is converted into light sheet by each cylindrical lens and is irradiated onto the specimen via the relay system 22c. In other words, the illumination optical system is configured so as to form a plurality of light sheets (LL1, LL2, LL3, LL4) on the specimen S. Further, the illumination optical system is configured so that the thickness T of light sheet illumination that comprises a plurality of light sheets is equal to or less than the focal depth of the detection optical system 9.

The illumination device only needs to include an illumination optical system that forms a plurality of light sheets on the specimen S. Consequently, the microscope system according to the present embodiment may include any of illumination devices (illumination device 32, illumination device 42, illumination device 50, illumination device 51) illustrated in FIG. 15 to FIG. 18 in place of the illumination device 22 illustrated in FIG. 14.

Figure 15:
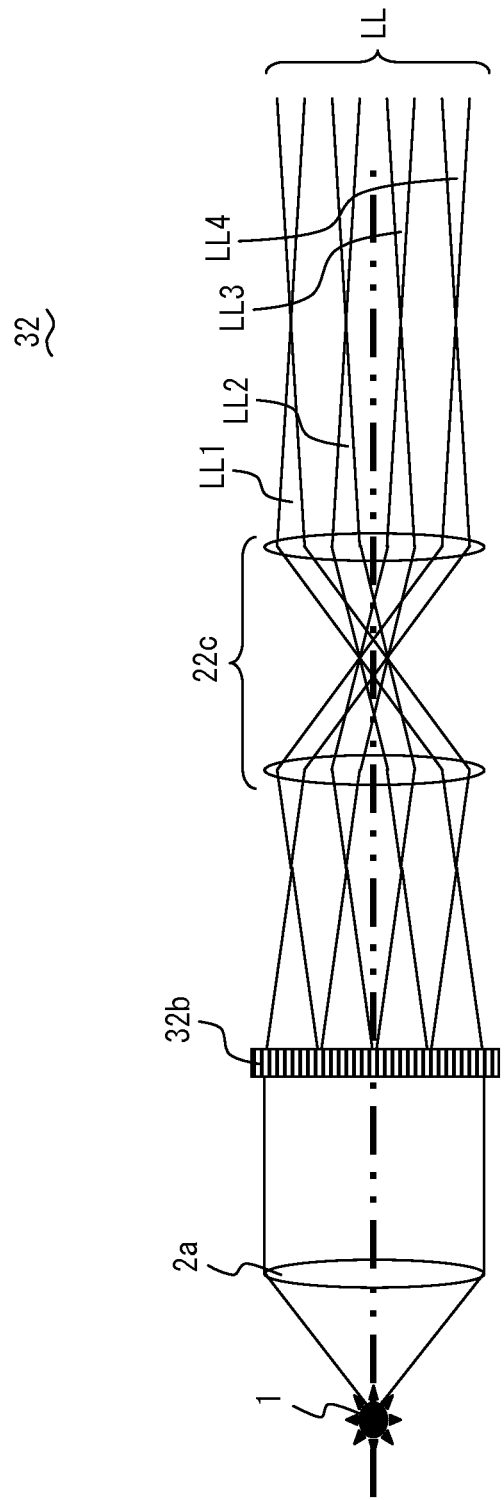
FIG. 15 is a diagram illustrating a first modified example of the configuration of the illumination device according to the fourth embodiment.

The illumination device 32 illustrated in FIG. 15 differs from the illumination device 22 illustrated in FIG. 14 in including a spatial light phase modulator 32b in place of the cylindrical lens array 22b. The spatial light phase modulator 32b is a device having pixel elements arrayed two-dimensionally and, for example, is a liquid crystal device, such as an LCOS device. Each pixel element is controlled independently and modulates the phase of incident light. It is possible for the illumination device 32 to form a plurality of light sheets by modulating the phase of incident light by using the spatial light phase modulator 32b. It may also be possible to implement the same function by means of a hologram optical element in place of the spatial light phase modulator 32b.

Figure 16:
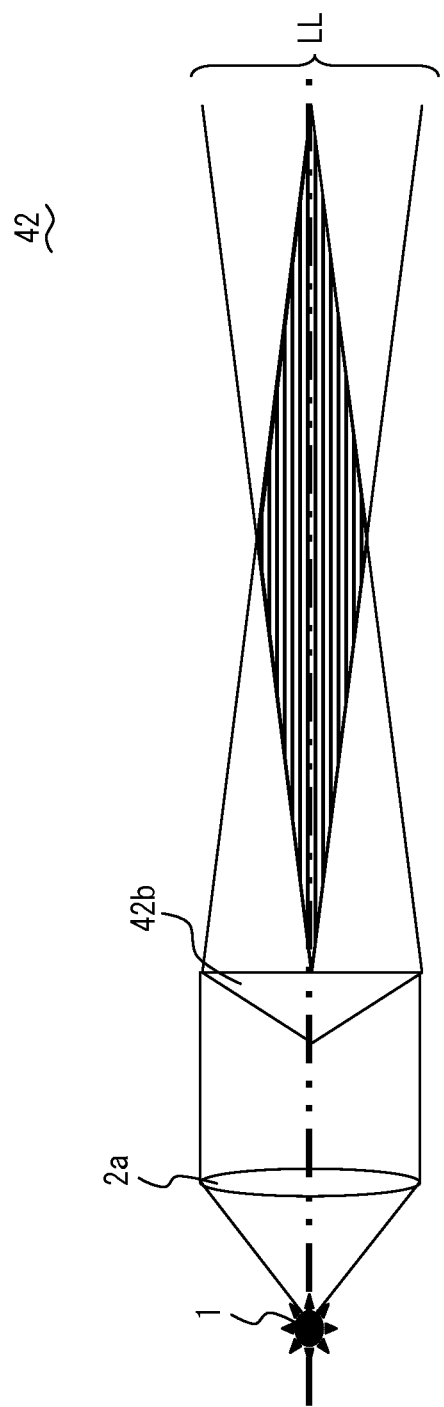
FIG. 16 is a diagram illustrating a second modified example of the configuration of the illumination device according to the fourth embodiment.

The illumination device 42 illustrated in FIG. 16 differs from the illumination device 22 illustrated in FIG. 14 in including a prism 42b in place of the cylindrical lens array 22b and the relay system 22c. As the light source 1, a laser is used. The illumination device 42 forms a plurality of light sheets by causing interference of light emitted from the prism 42b.

The illumination device 50 illustrated in FIG. 17 differs from the illumination device 22 illustrated in FIG. 14 in including an optical fiber 52 and a collimator lens array 52a in place of the collimator lens 2a, and in not having the relay system 22c. The illumination device 50 causes light from the light source 1 to branch by means of the optical fiber 52, and each beam of the light having branched is collimated by each collimate lens of the collimator lens array 52a. The illumination device 50 forms a plurality of light sheets on a specimen by converting each parallel light beam into a light sheet by means of each cylindrical lens constituting the cylindrical lens array 22b.

Figure 18:
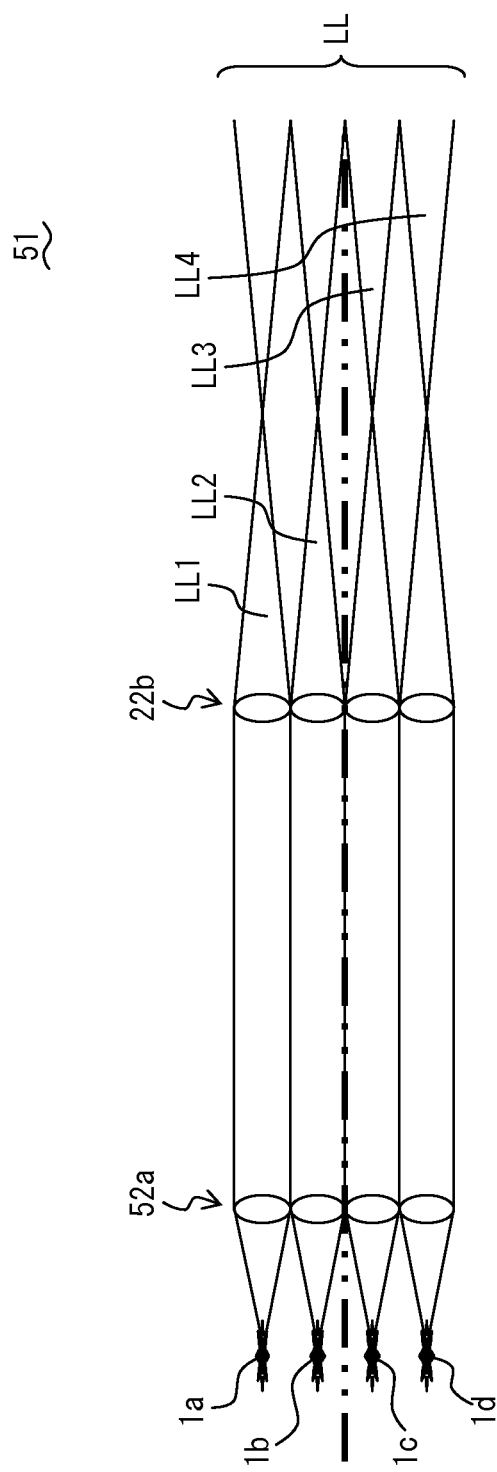
FIG. 18 is a diagram illustrating a fourth modified example of the configuration of the illumination device according to the fourth embodiment.

The illumination device 51 illustrated in FIG. 18 differs from the illumination device 50 illustrated in FIG. 17 in including a plurality of light sources (light source 1a, light source 1b, light source 1c, light source 1d) in place of the light source 1 and the optical fiber 52. By means of the illumination device 51, it is also possible to form a plurality of light sheets on a specimen as in the case of the illumination device 50 illustrated in FIG. 17.

In the microscope system according to the present embodiment configured as above, the stereo image capturing device captures images of the specimen S in a plurality of different directions in which the resolution in the Z direction based on the triangulation method is less than a distance G between a plurality of light sheets (resolving power becomes high) as illustrated in FIG. 4.

The resolution in the Z direction based on the triangulation method may be greater than a thickness Is of each of the plurality of light sheets as long as the above-described conditions are fulfilled. The reason is that as long as the above-described conditions are fulfilled, at least the thickness Ts of each of the plurality of light sheets is guaranteed as the resolution in the Z direction of the microscope system according to the present embodiment.

Figure 19:
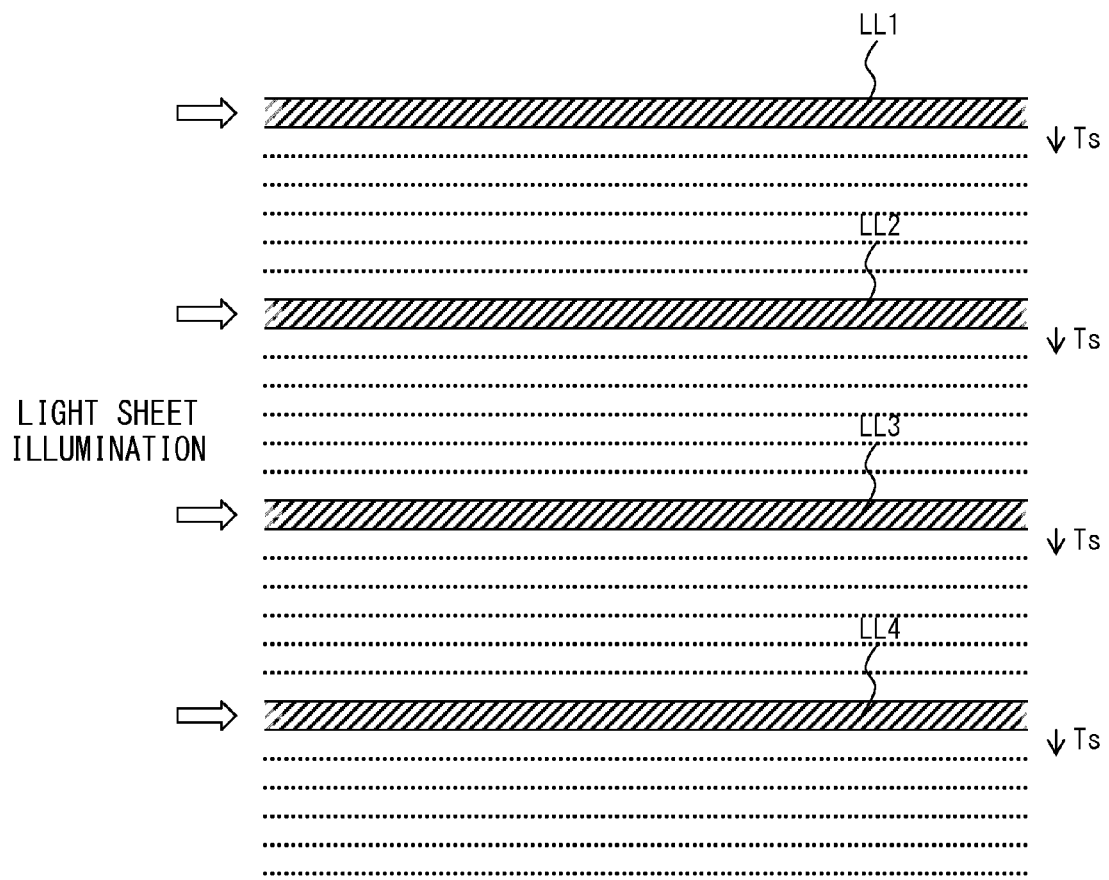
FIG. 19 is a diagram illustrating one example of movement of illumination by an illumination position moving device according to the fourth embodiment.

Further, in the microscope system according to the present embodiment, the Z drive mechanism 4 moves the positions of the plurality of light sheets so that in the regions that are located between the plurality of light sheets before the movement in the specimen S, the plurality of sheet illuminations are formed after the movement. In other words, the Z drive mechanism 4 is an illumination position moving device that moves the position on the specimen S on which the plurality of light sheets are formed in the Z direction. More specifically, it is desirable for the Z drive mechanism 4 to move the specimen holder 3 in the Z direction by an amount corresponding to the thickness Ts of each of the plurality of light sheets each time as illustrated in FIG. 19. The reason is that it is possible to capture images without leaving any gap between the light sheets by causing the Z drive mechanism 4 to operate in this manner.

By means of the microscope system according to the present embodiment also, three-dimensional information of the specimen S is generated by the control analysis device 20 performing pattern matching processing on a plurality of images of the specimen S output from the CCD camera 8.

By means of the microscope system according to the present embodiment, it is possible to generate three-dimensional information at a high speed by identifying a plurality of light sheets by using the stereo measuring technique while maintaining a high Z resolving power by using thin light sheets. By means of the microscope device according to the present embodiment, it is possible to provide a plurality of images from which three-dimensional information having a high Z resolving power can be generated to the control analysis device 20 in a brief time. Further, in the microscope system according to the present embodiment, a high Z resolving power is guaranteed by light sheet illumination, and therefore, it is not necessary to set the baseline length D of the triangulation method to an excessive length. Because of this, the degree of freedom in design is improved, as in enabling the lens diameter of the detection optical system 9 to be reduced.

Fifth Embodiment

The microscope system according to the present embodiment differs from the microscope system 200 according to the second embodiment in including the illumination device 22 illustrated in FIG. 14 in place of the light source 1 and the illumination optical system 2.

In the microscope system according to the present embodiment, the stereo image capturing device captures images of the specimen S in a plurality of different directions in which the resolution in the Z direction based on the triangulation method is less than the distance G between a plurality of light sheets (resolving power becomes high) as illustrated in FIG. 4. Further, the Z drive mechanism 4 moves the positions of the plurality of light sheets so that in the regions that are located between the plurality of light sheets in the specimen S before the movement, the plurality of light sheets are formed after the movement. More specifically, it is more desirable to move the specimen holder 3 in the Z direction by an amount corresponding to the thickness Is of each of the plurality of light sheets each time as illustrated in FIG. 19. These points are the same as those in the case of the microscope system according to the fourth embodiment.

By means of the microscope system and the microscope device according to the present embodiment, it is also possible to obtain the same effects as those of the microscope system and the microscope device according to the fourth embodiment. Further, it is possible to simultaneously capture images of the specimen S in a plurality of different directions, and therefore, it is possible to generate three-dimensional information at a higher speed by acquiring a plurality of images in a briefer time.

Sixth Embodiment

The microscope system according to the present embodiment differs from the microscope system 300 according to the third embodiment in including the illumination device 22 illustrated in FIG. 14 in place of the light source 1 and the illumination optical system 2.

In the microscope system according to the present embodiment, the stereo image capturing device captures images of the specimen S in a plurality of different directions in which the resolution in the Z direction based on the triangulation method is less than the distance G between a plurality of light sheets (resolving power becomes high) as illustrated in FIG. 4. Further, the Z drive mechanism 4 moves the positions of the plurality of light sheets so that in the regions that are located between the plurality of light sheets in the specimen S before the movement, the plurality of light sheets are formed after the movement. More specifically, it is more desirable to move the specimen holder 3 in the Z direction by an amount corresponding to the thickness Ts of each of the plurality of light sheets each time as illustrated in FIG. 19. These points are the same as those in the case of the microscope system according to the fourth embodiment.

By means of the microscope system and the microscope device according to the present embodiment, it is also possible to obtain the same effects as those of the microscope system and the microscope device according to the fourth embodiment.

Each embodiment described above illustrates a specific example in order to make the inventions easy to understand, and the inventions are not limited to those above. The microscope device and the microscope system can be modified and altered in a variety of ways within a scope not deviating from the idea of the present inventions specified in the claims.

For example, the microscope system 100 according to the first embodiment may include a color filter in place of the aperture 6. It may also be possible to simultaneously detect fluorescence in a plurality of different colors by arranging a plurality of color filters having different transmission wavelengths so as to act on regions in which light fluxes that enter the pupil positions of the detection optical system 9 are different from one another. In this case, by repeating image capturing while switching the positions of the plurality of color filters, it is possible to capture images of the specimen S in a plurality of different directions for each color.

Figure 20A:
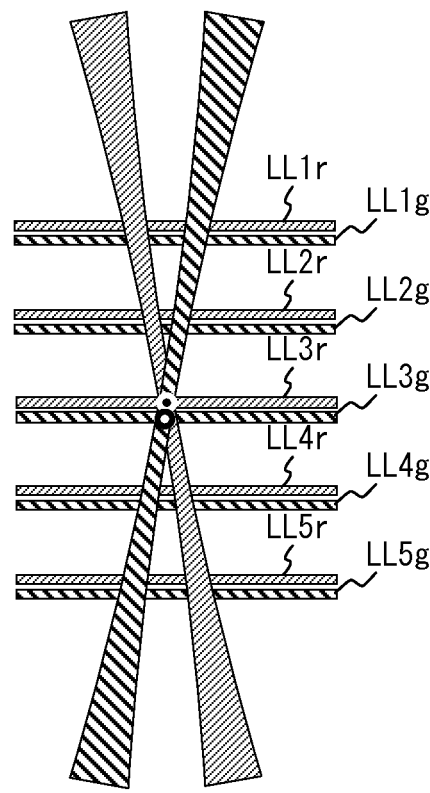
FIG. 20A is a diagram illustrating an example in which a plurality of light sheets are formed by light in two colors.
Figure 20B:
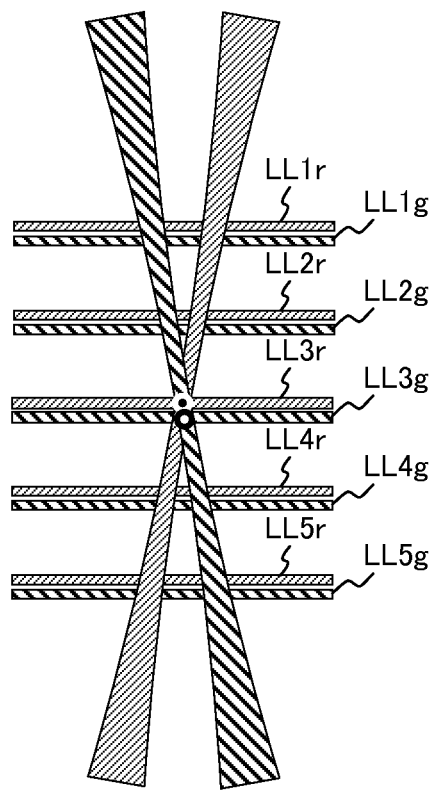
FIG. 20B is a diagram illustrating an example in which a plurality of light sheets are formed by light in two colors, and a diagram illustrating an example in which the position of a stereo image capturing device is changed from that in FIG. 20A.

Further, the microscope system according to the fourth embodiment to the sixth embodiment may form a plurality of light sheets including light sheets in two or more colors. Those illuminations are implemented by, for example, the plurality of light sources illustrated in FIG. 18 emitting light having different wavelengths. FIG. 20A and FIG. 20B illustrate examples in which a plurality of red light sheets (light sheet illumination LL1r to light sheet illumination LL5r) and a plurality of green light sheets (light sheet illumination LL1g to light sheet illumination LL5g) are formed, respectively. As illustrated in FIG. 20A and FIG. 20B, by capturing images of sheets in two colors in two different directions by means of the stereo image capturing device without changing the illumination positions, it is possible to generate three-dimensional information for each color.

The distance between the light sheets in different colors may be made less than the resolution in the Z direction based on the triangulation method. The reason is that the detected light resulting from the light sheets in different colors has different colors (wavelengths), and therefore, it is possible to detect the light by separating the light according to wavelength.

Each embodiment of the present inventions can also be applied to generation of a super-resolution image using a localization method, such as STORM (STochastic Optical Reconstruction Microscopy) or GSD (Ground State Depletion).

What is claimed is:

1. A microscope device comprising:
   an illumination optical system that illuminates a specimen with a light sheet; and
   a stereo image capturing device that captures images of the specimen in a plurality of different directions in which a resolution based on a triangulation method in a Z direction orthogonal to a direction of a single light sheet formed on the specimen by the illumination optical system is less than a thickness in the Z direction of light sheet illumination that comprises the single light sheet,
   wherein the stereo image capturing device includes:
      an image capturing device that captures an image of the specimen; and
      a detection optical system that forms an optical image of the specimen on the image capturing device, and
   wherein the thickness in the Z direction of light sheet illumination that comprises the single light sheet is equal to or less than a focal depth of the detection optical system.

2. The microscope device according to claim 1, wherein the thickness in the Z direction of light sheet illumination that comprises the single light sheet is at least ½ of the focal depth of the detection optical system.

3. The microscope device according to claim 1, wherein:
   the stereo image capturing device further includes a mechanism for changing a direction of an optical axis of the detection optical system and captures images of the specimen in a plurality of states where the direction of the optical axis of the detection optical system is different, and
   a distance between principal points of the detection optical system in the plurality of different states is longer than a baseline length of a triangulation method which is calculated from the focal length of the detection optical system, a resolution in the Z direction based on the triangulation method, and a resolution of the microscope device in a direction orthogonal to the Z direction in a case where a thickness in the Z direction of light sheet illumination that comprises the single light sheet is taken to be the resolution in the Z direction based on the triangulation method.

4. The microscope device according to claim 1, wherein the stereo image capturing device includes:
   a plurality of the image capturing devices that capture images of the specimen; and
   a plurality of the detection optical systems that respectively form optical images of the specimen on different image capturing devices of the plurality of image capturing devices and in which the direction of each optical axis is different.

5. The microscope device according to claim 4, wherein a distance between principal points of the plurality of detection optical systems is longer than a baseline length of a triangulation method which is calculated from the focal length of the plurality of detection optical systems, a resolution in the Z direction based on the triangulation method, and a resolution of the microscope device in a direction orthogonal to the Z direction in a case where a thickness in the Z direction of light sheet illumination that comprises the single light sheet is taken to be the resolution in the Z direction based on the triangulation method.

6. A microscope device comprising:
an illumination optical system that illuminates a specimen with a light sheet; and
a stereo image capturing device that captures images of the specimen in a plurality of different directions in which a resolution based on a triangulation method in a Z direction orthogonal to a direction of a single light sheet formed on the specimen by the illumination optical system is less than a thickness in the Z direction of light sheet illumination that comprises the single light sheet,
wherein the stereo image capturing device includes:
an image capturing device that captures an image of the specimen;
a detection optical system that forms an optical image of the specimen on the image capturing device, and
a shielding member that is arranged at a pupil position of the detection optical system and which partially shields light from the specimen entering a pupil of the detection optical system, and
wherein the stereo image capturing device captures images of the specimen in a plurality of states where a range of the pupil of the detection optical system, in which light from the specimen is shielded by the shielding member, is different.

7. The microscope device according to claim 6, wherein a distance between centers of a plurality of light fluxes passing through the shielding member in the plurality of different states when the light fluxes pass through the principal plane of the detection optical system is longer than a baseline length of a triangulation method which is calculated from the focal length of the detection optical system, a resolution in the Z direction based on the triangulation method, and a resolution of the microscope device in a direction orthogonal to the Z direction in a case where a thickness in the Z direction of light sheet illumination that comprises the single light sheet is taken to be the resolution in the Z direction based on the triangulation method.

8. A microscope system comprising:
the microscope device according to claim 1; and
an arithmetic operation device that generates three-dimensional information of the specimen by performing pattern matching based on a plurality of images of the specimen generated by the stereo image capturing device of the microscope device.

9. A microscope device comprising:
an illumination optical system that illuminates a specimen with a light sheet; and
a stereo image capturing device that captures images of the specimen in a plurality of different directions in which a resolution based on a triangulation method in a Z direction orthogonal to a direction of a plurality of light sheets simultaneously formed on the specimen by the illumination optical system is less than a thickness in the Z direction of light sheet illumination that comprises the plurality of light sheets,
wherein the stereo image capturing device includes:
an image capturing device that captures an image of the specimen; and
a detection optical system that forms an optical image of the specimen on the image capturing device, and
wherein the thickness in the Z direction of light sheet illumination that comprises the plurality of light sheets is equal to or less than a focal depth of the detection optical system.

10. The microscope device according to claim 9, wherein the illumination optical system forms the light sheet illumination that comprises the plurality of light sheets on the specimen, and
the stereo image capturing device captures images of the specimen in a plurality of different directions in which the resolution in the Z direction is less than a distance between the plurality of light sheets.

11. The microscope device according to claim 10, further comprising an illumination position moving device that moves in the Z direction the positions on the specimen on which the plurality of light sheets are formed,
wherein the illumination position moving device moves the positions of the plurality of light sheets so that in regions that are located between the plurality of light sheets on the specimen before movement, the plurality of light sheets are formed after the movement.

12. The microscope device according to claim 10, wherein the stereo image capturing device further includes a shielding member that is arranged at a pupil position of the detection optical system and which partially shields light from the specimen entering a pupil of the detection optical system, and
wherein the stereo image capturing device captures images of the specimen in a plurality of states where a range of the pupil of the detection optical system, in which light from the specimen is shielded by the shielding member, is different.

13. The microscope device according to claim 10, wherein the stereo image capturing device further includes a mechanism for changing a direction of an optical axis of the detection optical system, and
the stereo image capturing device captures images of the specimen in a plurality of states where the direction of the optical axis of the detection optical system is different.

14. The microscope device according to claim 10, wherein the stereo image capturing device includes:
a plurality of the image capturing devices that capture images of the specimen; and
a plurality of the detection optical systems that respectively form optical images of the specimen on different image capturing devices of the plurality of image capturing devices and in which the direction of each optical axis is different.

15. A microscope system comprising:
the microscope device according to claim 9; and
an arithmetic operation device that generates three-dimensional information of the specimen by performing pattern matching based on a plurality of images of the specimen generated by the stereo image capturing device of the microscope device.

* * * * *